United States Patent [19]

Zierpka et al.

[11] Patent Number: 5,562,196
[45] Date of Patent: Oct. 8, 1996

[54] FEEDING ARRANGEMENT FOR TRANSPORTING MATERIAL STEP-WISE OR INTERMITTENT OPERATING PRODUCTION MACHINES

[75] Inventors: Günter Zierpka, Elfenweg 2, D-76199 Karlsruhe; Friedbert Meier, Stutensee-Staffort, both of Germany

[73] Assignee: Günter Zierpka, Karlsruhe, Germany

[21] Appl. No.: 296,741

[22] Filed: Aug. 26, 1994

[30] Foreign Application Priority Data

Sep. 16, 1993 [DE] Germany ............................ 43 31 479.1

[51] Int. Cl.$^6$ .................................................. B65G 25/00
[52] U.S. Cl. ...................................... 198/621.1; 72/405.16
[58] Field of Search ........................ 198/621.1; 414/751; 72/405, 405.16

[56] References Cited

U.S. PATENT DOCUMENTS

| | | | |
|---|---|---|---|
| 4,741,195 | 5/1988 | Arai et al. ............................. | 198/621.1 |
| 5,267,463 | 12/1993 | Doyama ................................ | 198/621.1 |

*Primary Examiner*—Joseph E. Valenza
*Attorney, Agent, or Firm*—Max Fogiel

[57] ABSTRACT

A device for discontinuously advancing stock or work along or in discontinuously operating production machinery, a press for example. The stock or work is gripped by grips distributed along parallel and separated rails. The grip-supporting rails extend in the direction the stock or work advances in. The rails have three different motions, specifically back and forth together in the direction the stock or work moves in, together and apart transversely at at least one essentially right angle to that direction, and up and down together. A separate drive mechanism discontinuously governs each motion. The separate drive mechanisms are positioned essentially symmetrical to and below the rails. The drive that moves the grip-supporting rails together and apart accommodates at least one spindle that is engaged by a motor. The drive that moves the rails up and down accommodates at least one spindle that is engaged by another motor. The together-and-apart and up-and-down motions are derived from blocks that travel back and forth along the spindles without tilting and across the direction the stock or work advances in.

13 Claims, 4 Drawing Sheets

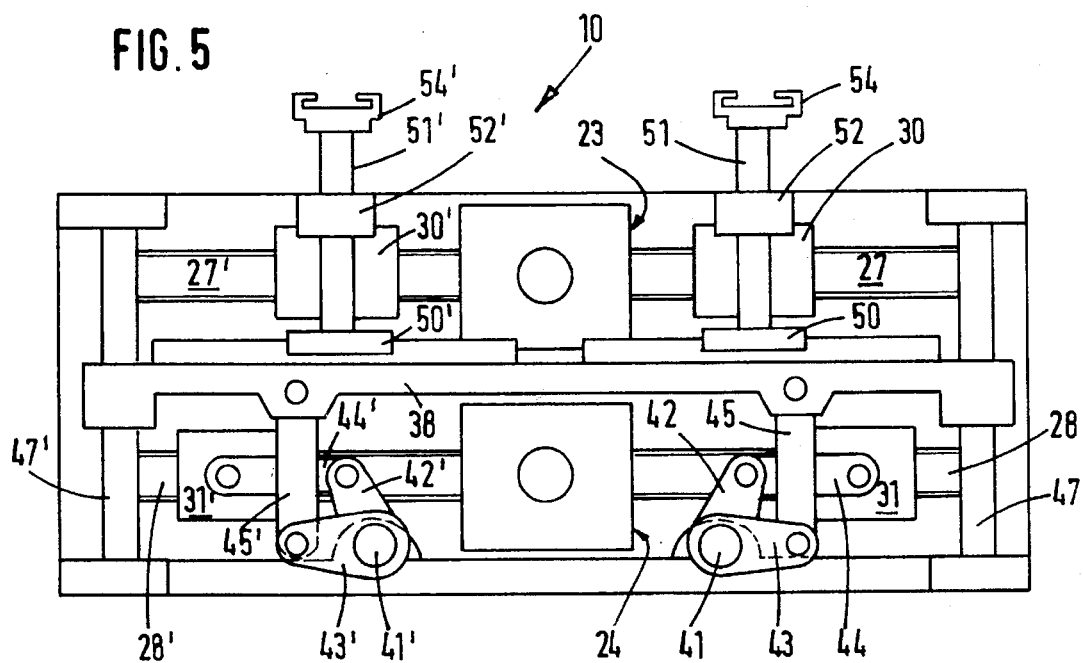
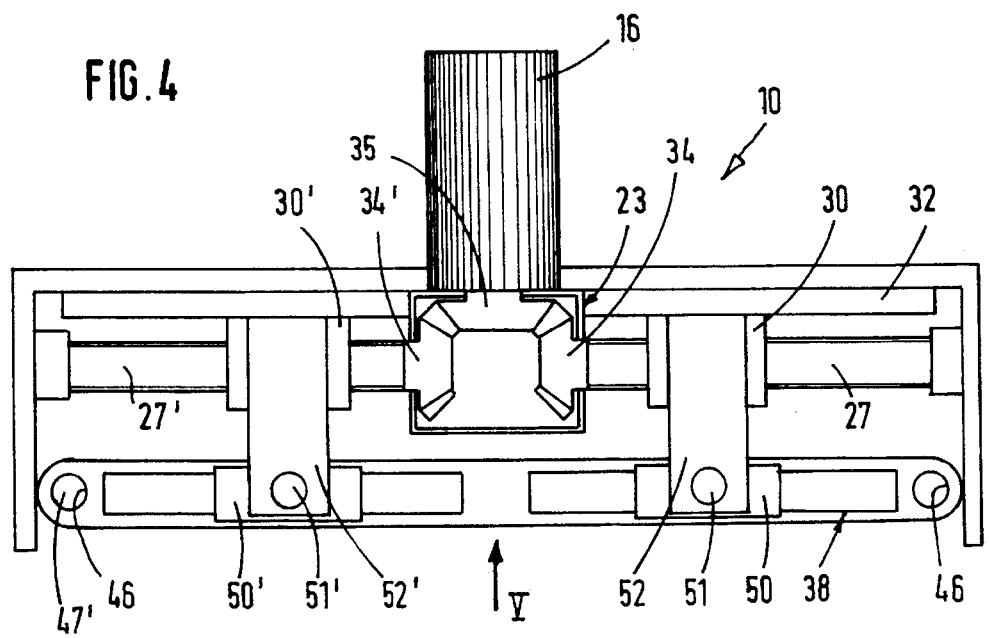

FEEDING ARRANGEMENT FOR TRANSPORTING MATERIAL STEP-WISE OR INTERMITTENT OPERATING PRODUCTION MACHINES

BACKGROUND OF THE INVENTION

The present invention concerns a device for discontinuously advancing stock or work along or in discontinuously operating production machinery, a press for example. The stock or work is gripped by grips distributed along parallel and separated rails. The grip-supporting rails extend in the direction the stock or work advances in. The rails have three different motions, specifically back and forth together in the direction the stock or work advances in, together and apart transversely at at least one essentially right angle to that direction, and up and down together. A separate drive mechanism discontinuously governs each motion.

A device for advancing work with parallel rails is known from German 3 329 900 C2. The rails move in the three dimensions subject to advancing, tensioning, and lifting mechanisms driven by separate mechanisms.

What is unsatisfactory in this known device is that the drive mechanisms take up a lot of space. Their motors extend out at the side. The mechanics are complicated and result in relatively high inertia, which slows down the rails and wears out the mechanisms prematurely. Precision is increasingly difficult to ensure.

SUMMARY OF THE INVENTION

The object of the present invention is accordingly a stock-or-work advancing device of the aforesaid genus that will take up little space and will be constituted of mechanisms that allow rapid operation and do not wear out rapidly.

This object is attained in accordance with the present invention in a stock-or-work advancing device in which first, the separate drive mechanisms are positioned essentially symmetrical to and below the rails. Second, the drive that moves the grip-supporting rails together and apart accommodates at least one spindle that is engaged by a motor. Third, the drive that moves the rails up and down accommodates at least one spindle that is engaged by another motor. Finally, the together-and-apart and up-and-down motions are derived from blocks that travel back and forth along the spindles without tilting and across the direction the stock or work advances in.

It is accordingly characteristic of the present invention that the together-and-apart and up-and-down motions of the rails are each governed by an individual drive mechanism. The spindle in each mechanism parallels that in the other and extends at an angle to the direction the stock or work advances in. The spindles decrease wear, and the design of the drive mechanisms and their position essentially symmetrical to and below the rails makes the device more compact.

Each spindle-accommodating drive in one advantageous embodiment of the invention accommodates a transmission and two spindles.

The spindles are coaxial and extend in opposite directions out of the transmission. They rotate in opposite directions. The transmission connects the spindles to the motor that drives them. It is practical for the transmissions in the spindle-accommodating drives to be beveled-cogwheel transmissions. One cogwheel will in this event be engaged by its associated motor and will engage driven cogwheels secured to the ends of the spindles toward the transmission.

Drive mechanisms of this description allow a particularly simple and comprehensible overall design. It is even more practical for the spindles in the spindle-accommodating derive to extend at a right angle to the direction the stock or work advances in.

A lifter rail that travels up and down is associated with the spindle-accommodating drive that moves the grip-supporting rails up and down, and the motion of the lifter rail is derived from the blocks that travel back and forth along the spindles in that drive and can be transmitted to grip supporting-rail accommodation tracks. It has been demonstrated practical for generating the up-and-down motion for the lifter rail to engage the blocks on the spindle by way of at least one articulated transmission consisting of two articulated levers that pivot around an axis paralleling the direction the stock or work advances in.

A stock-or-work advancing device with rails that move up and down is admittedly known from German OS 2 375 980, although their up-and-down motion derives from a cam and is transmitted by a frame that moves up and down and accommodates tracks that accommodate the grip-supporting rails. In contrast to this known embodiment, the masses that have to be moved up and down in the stock-or-work advancing device in accordance with the present invention are small.

Articulated transmissions attaching the lifter rail to the block and positioned more or less symmetrically on each side of the transmission in the spindle-accommodating drive that moves the grip-supporting rails up and down have turned out to be practical in another advanced version of the present invention. The arm that pivots around the axis of each articulated lever and connects to the arm that connects to the lifter rail can in this event extend out from that axis and away from the transmission.

Due to the assignment of each articulated transmission to one of the blocks on the spindles in the spindle-accommodating drive that moves the grip-supporting rails up and down, the separate motions of the blocks are transmitted symmetrically to the lifter rail due to transformation of the linear motion into up-and-down motion by the articulated transmission. The up-and-down motion is transmitted in turn to the lifter rail by the aforesaid additional links.

It has also turned out to be practical for the lifter rail to parallel a transverse track that prevents the blocks in the same spindle-accommodating drive from tilting and to be equipped with slides that slide back and forth along it. The slides can be coupled to longitudinal tracks that accommodate the grip-supporting rails. The positions of the slides along the lifter rail are dictated by the instantaneous position of the blocks in the spindle-accommodating drive that moves the grip-supporting rails together and apart. This approach minimizes the masses that have to be raised and lowered.

Each of the slides that slide back and forth along the lifter rail in this embodiment can be coupled by a bar that projects up from its upper surface and loosely through a matching accommodation through a block in the spindle-accommodating drive that moves the grip-supporting rails together and apart to that block and to a horizontal-rail longitudinal track on the end of a pin extending beyond the accommodation in the block. It is practical for the bars that project up from the upper surface of the slides that slide back and forth along the lifter rail to be round. This approach will of course make the component less expensive to manufacture.

Only the lifter rail, the slides that slide back and forth it and have bars projecting up from their upper surface, and the grip supporting-rail accommodation tracks on the aforesaid bars with the grip-supporting rails accommodated therein participate in the up-and-down motion in an embodiment of this type. The coupling, round or not, between the bars that project up from the upper surface of the slides that slide back and forth along the lifter rail and the grip supporting-rail accommodation tracks can easily be established by allowing the free end of each round bar to engage a recess on the bottom of the particular grip supporting-rail accommodation track.

Each spindle drive in still another embodiment of the present invention accommodates a track that the blocks slide back and forth along across the direction the stock or work advances in and that prevents them from tilting. The blocks will accordingly remain upright when the spindles rotate.

Simple and precise positioning of the lifter rail as it moves up and down can also be ensured when in accordance with another embodiment of the present invention the lifter rail travels up and down on vertical tracks extending through perforations in its opposite ends and secured to the overall device. In one particularly simple and cost-effective design for the stock-or-work advancing device the spindle-accommodating drives have similar transmissions and spindles. It has been demonstrated to be particularly practical and low-wear for the transmissions to be ball-and-spindle transmissions.

BRIEF DESCRIPTION OF THE DRAWINGS

One embodiment of a stock-or-work advancing device in accordance with the present invention will now be specified with reference to the attached drawing, wherein FIG. 4 is a top view of the stock-or-work advancing device illustrated in FIG. 3 without the grip-supporting rails and the longitudinal tracks that accommodate them, whereby the drive mechanism that moves the grip-supporting rails back and forth is represented in section, and FIG. 5 is an end-on view of the device from the direction represented by arrow V in FIG. 4.

DESCRIPTION OF THE PREFERRED EMBODIMENTS

Figure 1:
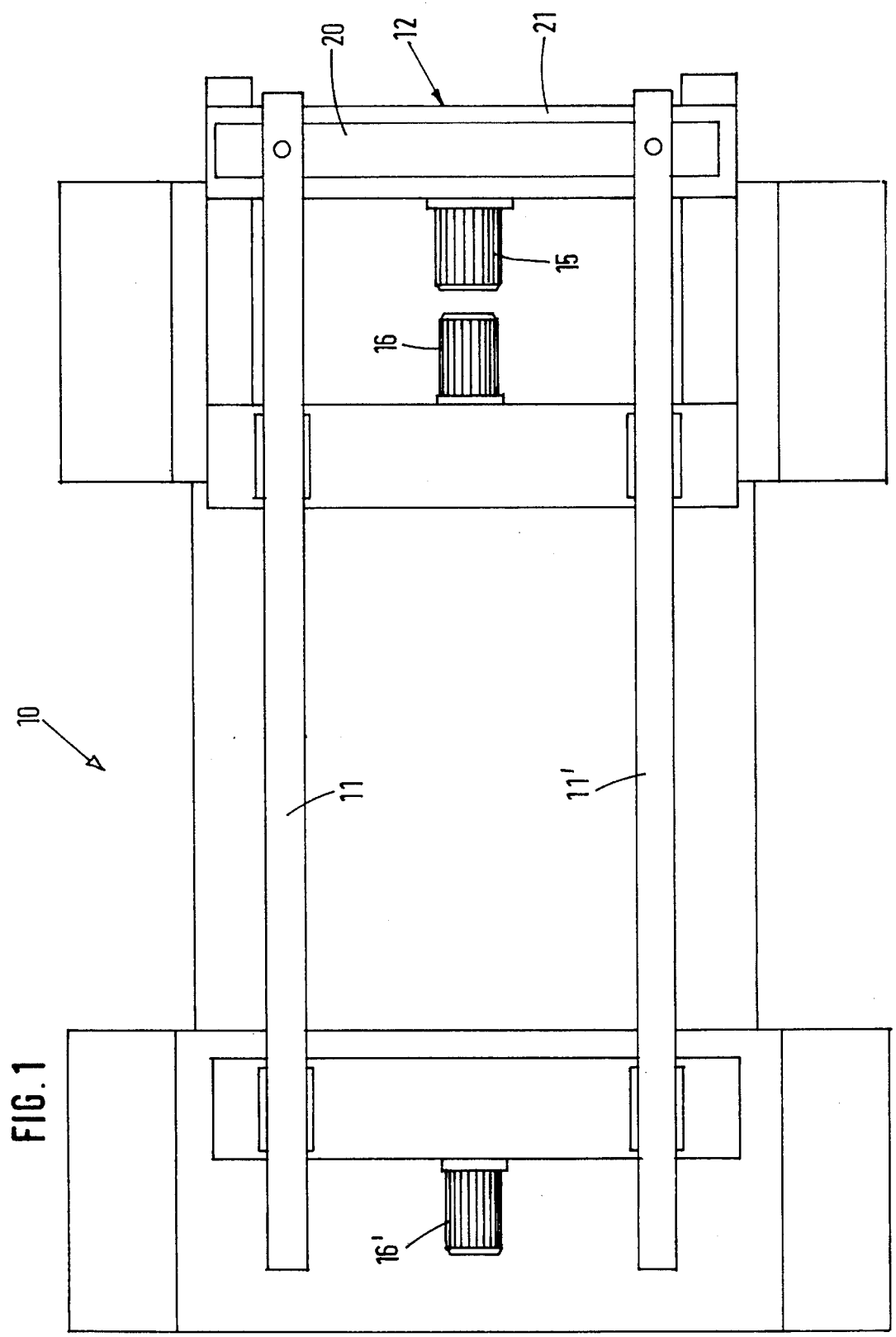
FIG. 1 is a top view of a stock-or-work advancing device with two grip-supporting rails extending in the direction the stock or work advances in and with individual drive mechanisms in a plane of symmetry between the rails.

The illustrated stock-or-work advancing device 10 accommodates two parallel and separated grip-supporting rails 11 and 11'.

Rails 11 and 11' extend along the direction the stock or work advances in. The rails move back and forth together in the direction the stock or work advances in, toward and away from each other in a horizontal plane at an angle to that direction, and up and down together. Each such motion is produced by a separate drive mechanism 12, 13, and 14 powered by an electric motor 15, 16, or 17.

Distributed along rails 11 and 11' are grips for securing the stock or work that the device discontinuously advances. The grips are not of particular interest in the present context and will not be specified herein.

The drive mechanism 12 responsible for moving grip-supporting rails 11 and 11' back and forth along the direction the stock or work advances in accommodates a carriage 20. Rails 11 and 11' travel back and forth along with carriage 20 and transversely over it. The carriage is coupled to a transmission 21 powered by a motor 15. The system is of no particular interest in the present context and will not be specified. Drive mechanism 12 is positioned at one end of the device.

The drive mechanism 13 responsible for the together-and-apart motion of grip-supporting rails 11 and 11' accommodates a spindle-accommodating drive 23. Spindle-accommodating drive 23 accommodates a beveled-cogwheel transmission 25. Transmission 25 is directly coupled to a motor 16. A spindle 27 extends straight out of one end of transmission 25 and another spindle 27' straight out of the other end. Spindles 27 and 27' both extend across the direction the stock or work travels in. A traveling block 30 travels back and forth along spindle 27 and a similar block 30' along spindle 27'. Blocks 30 and 30' slide back and forth across the direction the stock or work travels in along a horizontal track 32.

The drive mechanism 14 responsible for the up-and-down motion of grip-supporting rails 11 and 11' is similar in design. It accommodates a spindle-accommodating drive 24. Spindle-accommodating drive 24 accommodates a beveled-cogwheel transmission 26. Transmission 26 is directly engaged by a motor 17. A spindle 28 extends straight out of one end of transmission 26 and another spindle 28' straight out of the other end. Spindles 28 and 28' both extend across the direction the stock or work travels in. A block 31 travels back and forth along spindle 28 and a similar traveling block 31' along spindle 28'. Blocks 31 and 31' slide back and forth across the direction the stock or work travels in along a horizontal track 33 secured stationary to the overall device.

Tracks 32 and 33 are secured stationary to the overall device, parallel to each other and to the spindles, and across the direction the stock or work travels in. The tracks prevent traveling blocks 30 & 30' and 31 & 31' from rotating.

Figure 2:
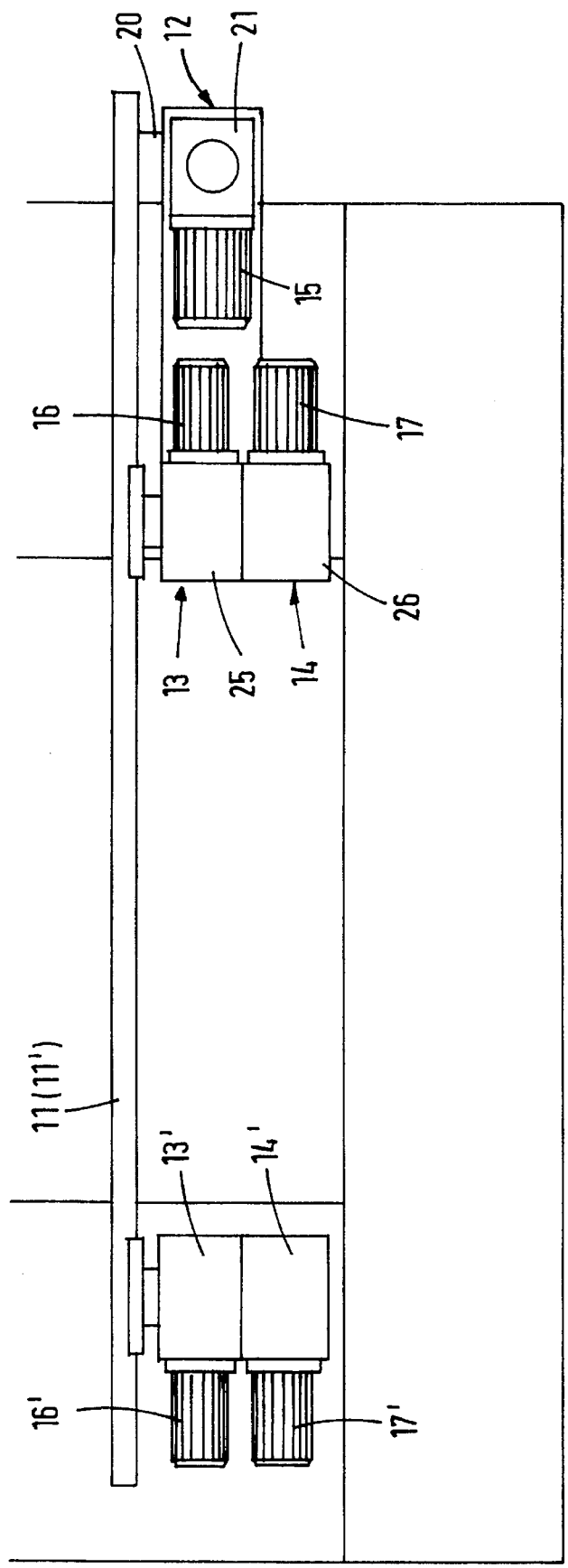
FIG. 2 is a side view of the device illustrated in FIG. 1.
Figure 3:
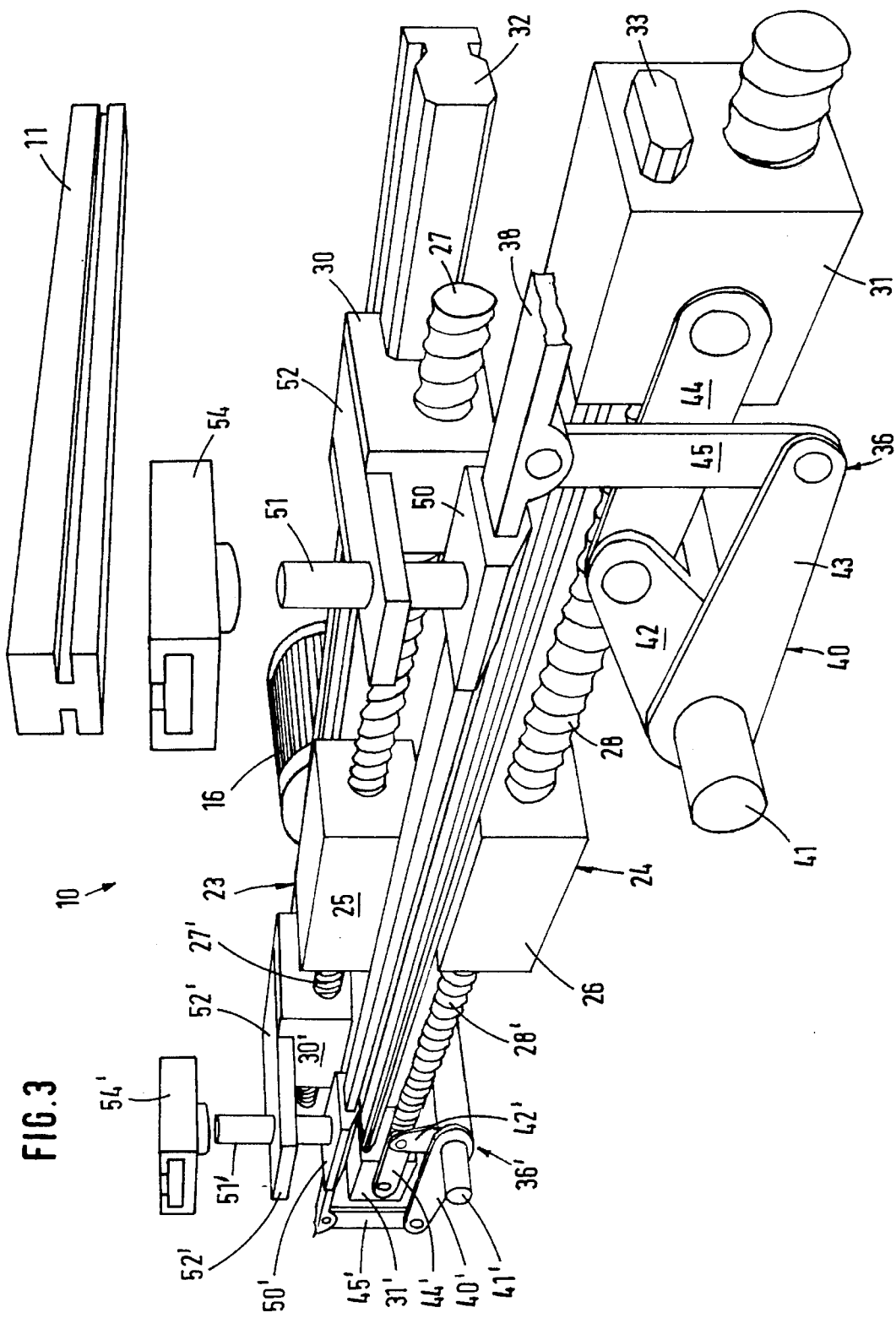
FIG. 3 is an exploded perspective view of part of the device with a drive mechanism for moving the grip-supporting rails transversely and another for moving them vertically and with blocks that travel back and forth along spindles on each side of each drive mechanism and engage both a lifter rail and slides that slide back and forth along it.

The drive mechanism 13 responsible for the together-and-apart motion of grip-supporting rails 11 and 11' and the drive mechanism 14 responsible for their up-and-down motion are positioned below the rails, one above the other, in a plane of symmetry between the rails, and somewhat remote from the drive mechanism 12 responsible for moving the grip-supporting rails back and forth along the direction the stock or work advances in. As will be evident from FIGS. 1 and 2, there are additional drive mechanisms 13' and 14' at the ends of grip-supporting rails 11 and 11' remote from the drive mechanism 12 responsible for moving them back and forth along the direction the stock or work advances in. Drive mechanism 13' helps move the rails together and apart and drive mechanism 14' up and down. Drive mechanisms 13' and 14' are similar to drive mechanism 13 and 14.

FIG. 4 illustrates the spindle-accommodating drive 23 that moves grip-supporting rails 11 and 11' together and apart in conjunction with beveled-cogwheel transmission 25 and the spindles 27 and 27' that extend out of its ends in opposite directions. The spindles are accommodated in unillustrated bearings on beveled-cogwheel transmission 25 that need not be specified herein. Beveled driven cogwheels 34 and 34' secured to the facing ends of spindles 27 and 27' are engaged by a beveled driving cogwheel 35 in transmission 25. Beveled driving cogwheel 35 itself is engaged and driven by motor 16. It drives spindles 27 and 27' in opposite directions. Spindle-accommodating drive 24, beveled-cogwheel transmission 26, and spindles 28 and 28' are similar. The transmissions employ ball-and-spindle mechanisms that are not in themselves of interest in the present context.

Each of the blocks 31 and 31' that travel together and apart on the spindles 28 and 28' in spindle-accommodating drive 24 engages a lifter rail 38 by way of an articulated transmission 36 and 36' respectively. Lifter rail 38 parallels the track 33 that prevents blocks 31 and 31' from tilting.

Articulated transmission 36 comprises a linkage 40 comprising four links 42, 43, 44, and 45. Link 42 and link 43 pivot around a common stationary axis 41. The free end of link 42 is articulated to link 44. The other end of link 44 pivots around an axis on traveling block 31. The free end of link 43 is articulated to link 45. Link 45 is articulated at the other end to lifter rail 38.

Articulated transmission 36' is similar to articulated transmission 36. It comprises a linkage 40' comprising four links 42', 43', 44', and 45'. Link 42' and link 43' pivot around a common stationary axis 41'. The free end of link 42' is articulated to link 44'. The other end of link 44' pivots around an axis on traveling block 31'. The free end of link 43' is articulated to link 45'. Link 45' is articulated at the other end to lifter rail 38.

Lifter rail 38 is perforated at each end and travels up and down on two vertical tracks 47 and 47' that extend through the perforations 46 and 46' and are fastened upright at each side.

It will be evident that, since spindle-accommodating drive 24 is symmetrical with respect to a plane intersecting the axis of the beveled driving cogwheel 35 in beveled-cogwheel transmission 26, blocks 31 and 31' will always move equal distances in opposite directions. Their linear motions are transmitted to lifter rail 38 by articulated transmissions 36 and 36', and lifter rail 38 will accordingly move up and down in response to the horizontal motions executed by the blocks.

Slides 50 and 50' slide back and forth along the lifter rail 38 that parallels block-tilting prevention tracks 32 and 33. A round bar 51 projects up from the upper surface of slide 50 and another round bar 51' projects up from that of slide 50'. Bar 51 couples slide 50 to the traveling nut 30 and bar 51' couples slide 51' to the traveling nut 30' in the spindle-accommodating drive 23 that produces the together-and-apart motion of grip-supporting rails 11 and 11'. The bar 51 that projects up from the upper surface of slide 50 extends through a flange 52 that projects horizontally out of the traveling nut 30 in spindle-accommodating drive 23, and the bar 51' that projects up from the upper surface of slide 50' extends through a flange 52' that projects horizontally out of the traveling nut 30' in spindle-accommodating drive 23. The positions of the slides 50 and 50' that slide back and forth along lifter rail 38 are accordingly dictated by the instantaneous positions of the traveling blocks 30 and 30' in the spindle-accommodating drive 23 that produces the together-and-apart motion of grip-supporting rails 11 and 11'. The tops of the rods 51 and 51' that project up from the upper surfaces of slides 50 and 50' and through flanges 52 and 52' are secured in matching accommodations in the bottoms of tracks 54 and 54' in the form of lengths of structural section that accommodate grip-supporting rails 11 and 11'.

It will be evident in relation to the hereintofore specified coupling between the rods 51 and 51' projecting up from the upper surfaces of the slides 50 and 50' that slide back and forth along lifter rail 38 and through flanges 52 and 52' and the traveling blocks 30 and 30' in the spindle-accommodating drive 23 that produces the together-and-apart motion of horizontal rails 11 and 11' on the one hand and grip supporting-rail accommodation tracks 54 and 54' on the other that the drive mechanism 13 responsible for the together-and-apart motion of horizontal rails 11 and 11' and including the spindle-accommodating drive 23 that moves them must extend at a right angle to the rails.

An up-and-down motion on the part of grip supporting-rail accommodation tracks 54 and 54' and hence of the grip-supporting rails 11 and 11' secured in them can be produced independent of the together-and-apart motion of the rails.

This up-and-down motion drives from the linear motions of the blocks 31 and 31' in the spindle-accommodating drive 24 that moves grip-supporting rails 11 and 11' up and down. The motion is permitted by the loose accommodation of the rods 51 and 51' that project up from the tops of slides 50 and 50' and through flanges 52 and 52' in the accommodations in the bottom of the flanges 52 and 52' that project horizontally out of the traveling blocks 30 and 30' in the spindle-accommodating drive 23 that moves the rails together and apart. The extent of the motion is dictated by the vertical extent of the rods 51 and 51' that project up from the tops of slides 50 and 50' and through flanges 52 and 52' on traveling blocks 30 and 30' on the one hand and on the other by the distance between flanges 52 and 52' and the slides 50 and 50' that travel back and forth along lifter rail 38. What is essential is that only grip-supporting rails 11 and 11' and grip supporting-rail accommodation tracks 54 and 54' participate in producing the motion.

We claim:

1. An arrangement for discontinuously advancing stock or work in discontinuously operating production machinery, comprising: gripping means distributed along parallel and separated rails for gripping the stock or work; grip-supporting rails extending in a direction the stock or work advances in, said rails having three different motions defined as a back and forth motion together in the direction the stock or work advances in, a together-and-apart motion transversely at at least one substantially right angle to said direction, and an up-and-down together motion; separate first drive means discontinuously governing each motion; said separate drive means being positioned substantially symmetrical to and below said grip-supporting rails; second drive means moving said rails together and apart and accommodating at least one first spindle; a first motor engaging said at least one first spindle; third drive means moving said rails up and down and accommodating at least one second spindle; a second motor engaging said at least one second spindle; first spindle nut means for generating said together-and-apart motion and traveling back and forth along said first and second spindles without tilting and across said direction the stock or work advances in; second spindle nut means for generating said up-and-down motion and traveling back and forth along said second spindle without tilting and across said direction the stock or work advances in; transmission means connecting said first and second spindles to said first and second motors, said second and third drive means accommodating said transmission means and said first and second spindles, said first and second spindles being coaxial and extending in opposite directions out of said transmission means and rotating in opposite directions; said first and second spindles in said first drive means extending at a right angle to said direction the stock or work advances in; a lifter rail traveling up and down and being associated with said third drive means moving said grip-supporting rails up and down, said lifter rail having a motion generated from said first and second spindle nut means traveling back and forth along said first and second spindles and being transmitted to grip supporting-rail accommodation tracks; said lifter rail engaging said second spindle nut means on said second spindle in one said third drive means by at least one articulated transmission with linkage means comprising two links pivoting around an axis parallel to said direction the stock or work advances in; and auxiliary links articulated to said two links.

2. An arrangement as defined in claim 1, wherein said transmission means comprises beveled-gear transmissions; a driving cogwheel engaging a respective one of said motors and engaging driven gears secured to ends of the spindles toward said transmission means.

3. An arrangement as defined in claim 1, wherein said transmission attaches said lifter rail to said second spindle nut means and is positioned substantially symmetrically on each side of said transmission means in said third spindle drive moving the grip-supporting rails up and down.

4. An arrangement as defined in claim 3, wherein said links pivoting around said axis extends out from said axis and away from said articulated transmission.

5. An arrangement as defined in claim 1, including a transverse track parallel to said lifter rail and preventing said first and second spindle nut means in said third drive means from tilting and having slides sliding back and forth therealong, said slides being coupled to said grip supporting-rail accommodation tracks, said slides having positions along said lifter rail dependent on an instantaneous position of said second spindle nut means in said drive means moving said grip-supporting rails.

6. An arrangement as defined in claim 5, wherein each of said slides sliding back and forth along said lifter rail being coupled by a bar projecting up from an upper surface of each said slides and loosely through a matching accommodation in said first spindle nut means on said second drive means moving said grip-supporting rails together and apart and to a horizontal-rail longitudinal track on an end of a pin extending beyond said accommodation in said first spindle nut means.

7. An arrangement as defined in claim 6, wherein said bar projecting up from an upper surface of each said slides is round.

8. An arrangement as defined in claim 7, wherein said round bar has a free end engaging a recess on a bottom of the respective grip supporting-rail accommodation track.

9. An arrangement as defined in claim 1, wherein each of said drive means accommodates a track that said spindles slide back and forth along across said direction the stock or work advances in, said track preventing said spindles from tilting.

10. An arrangement as defined in claim 1, wherein said lifter rail travels up and down on vertical tracks extending through perforations in opposite ends of said lifter rail.

11. An arrangement as defined in claim 1, wherein said drive means have similar transmissions and spindles.

12. An arrangement as defined in claim 1, wherein said transmission means are ball-and-spindle transmissions.

13. An arrangement for discontinuously advancing stock or work in discontinuously operating production machinery, comprising: gripping means distributed along parallel and separated rails for gripping the stock or work; grip-supporting rails extending in a direction the stock or work advances in, said rails having three different motions defined as a back and forth motion together in the direction the stock or work advances in, a together-and-apart motion transversely at at least one substantially right angle to said direction, and an up-and-down together motion; separate first drive means discontinuously governing each motion; said separate drive means being positioned substantially symmetrical to and below said grip-supporting rails; second drive means moving said rails together and apart and accommodating at least one first spindle; a first motor engaging said at least one first spindle; third drive means moving said rails up and down and accommodating at least one second spindle; a second motor engaging said at least one second spindle; first spindle nut means for generating said together-and-apart motion and traveling back and forth along said first and second spindles without tilting and across said direction the stock or work advances in; second spindle nut means for venerating said up-and-down motion and traveling back and forth along said second spindle without tilting and across said direction the stock or work advances in; transmission means connecting said first and second spindles to said first and second motors, said second and third drive means accommodating said transmission means and said first and second spindles, said first and second spindles being coaxial and extending in opposite directions out of said transmission means and rotating in opposite directions; said first and second spindles in said first drive means extending at a right angle to said direction the stock or work advances in; a lifter rail traveling up and down and being associated with said third drive means moving said grip-supporting rails up and down, said lifter rail having a motion generated from said first and second spindle nut means traveling back and forth along said first and second spindles and being transmitted to grip supporting-rail accommodation tracks; said lifter rail engaging said second spindle nut means on said second spindle in one said third drive means by at least one articulated transmission with linkage means comprising two links pivoting around an axis parallel to said direction the stock or work advances in; and auxiliary links articulated to said two links; said articulated transmission attaching said lifter rail to said second spindle nut means and being positioned substantially symmetrically on each side of said transmission means in said third spindle drive moving the grip-supporting rails up and down; said links pivoting around said axis extending out from said axis and away from said articulated transmission; a transverse track parallel to said lifter rail and preventing said first and second spindle nut means in said third drive means from tilting and sliding back and forth therealong, said slides being coupled to said grip supporting-rail accommodation tracks, said slides having positions along said lifter rail dependent on an instantaneous position of said second spindle nut means in said drive means moving said grip-supporting rails; each of said slides being coupled by a bar projecting up from an upper surface of each said slides and loosely through a matching accommodation in said first spindle nut means on said second drive means moving said grip-supporting rails together and apart and to a horizontal-rail longitudinal track on an end of a pin extending beyond said accommodation in said first spindle nut means; said bar projecting up from an upper surface of each said slides being round; said round bar having a free end engaging a recess on a bottom of the respective grip supporting-rail accommodation track; each of said drive means accommodating a track that said spindles slide back and forth along across said direction the stock or work advances in, said track preventing said spindles from tilting; said lifter rail traveling up and down on vertical tracks extending through perforations in opposite ends of said lifter rail; said drive means having similar transmissions and spindles.

* * * * *